United States Patent
Wilkinson et al.

(10) Patent No.: US 10,148,155 B2
(45) Date of Patent: Dec. 4, 2018

(54) METHOD AND APPARATUS FOR CONNECTING AN ULTRACOMPACT, HIGH-PERFORMANCE MOTOR CONTROLLER TO AN ULTRACOMPACT, HIGH-PERFORMANCE BRUSHLESS DC MOTOR

(71) Applicant: Barrett Technology, LLC, Newton, MA (US)

(72) Inventors: David Wilkinson, Dedham, MA (US); Peter Botticelli, Newton, MA (US); Donald Drumm, Newton, MA (US); Darren Landino, Newton, MA (US); Brian Zenowich, West Newton, MA (US); William Townsend, Weston, MA (US)

(73) Assignee: Barrett Technology, LLC, Newton, MA (US)

( * ) Notice: Subject to any disclaimer, the term of this patent is extended or adjusted under 35 U.S.C. 154(b) by 830 days.

(21) Appl. No.: 14/560,661

(22) Filed: Dec. 4, 2014

(65) Prior Publication Data
US 2015/0155765 A1    Jun. 4, 2015

Related U.S. Application Data

(60) Provisional application No. 61/911,558, filed on Dec. 4, 2013.

(51) Int. Cl.
*H02K 11/00* (2016.01)
*H02K 5/22* (2006.01)
(Continued)

(52) U.S. Cl.
CPC ......... *H02K 11/0073* (2013.01); *H02K 5/225* (2013.01); *H02K 11/0094* (2013.01); *H02K 11/33* (2016.01); *H02K 16/00* (2013.01)

(58) Field of Classification Search
CPC .... H02K 11/0073; H02K 5/225; H02K 11/33; H02K 16/00; H02K 11/0094; H02K 5/10;
(Continued)

(56) References Cited

U.S. PATENT DOCUMENTS

| 2,567,066 A | 9/1951 | Goldman |
| 3,789,233 A | 1/1974 | Winter |

(Continued)

FOREIGN PATENT DOCUMENTS

| JP | 3-38451 | 4/1991 |
| JP | 9-224390 | 8/1997 |

(Continued)

OTHER PUBLICATIONS

AllMotion, Inc., News Release, Worlds Smallest Servo From AllMotion Inc., www.allmotion.com/EZSV10pressrelease.htm, 2005.
(Continued)

*Primary Examiner* — Joshua Benitez Rosario
*Assistant Examiner* — Leda Pham
(74) *Attorney, Agent, or Firm* — Pandiscio & Pandiscio (57) ABSTRACT

Apparatus for connecting a motor controller to an electrical motor, said apparatus comprising:
a motor interface board;
a mounting mechanism for mechanically connecting said motor interface board to the electrical motor;
at least one input lead for electrically connecting said motor interface board to at least one of an electrical power source and an electrical signal source;
at least one output lead for electrically connecting said motor interface board to the electrical motor; and
at least one connector for mechanically and electrically connecting said motor interface board to the motor controller.

20 Claims, 5 Drawing Sheets

(51) Int. Cl.
 *H02K 16/00* (2006.01)
 *H02K 11/33* (2016.01)

(58) Field of Classification Search
 CPC .......... H02K 3/522; H02K 5/18; H02K 15/12; H02K 2205/09; H02K 9/22; H05K 1/0201; H05K 2201/10272; H05K 1/0263; F04D 25/08; F04D 25/082; F04D 29/5813
 USPC .......................................................... 310/71
 See application file for complete search history.

(56) References Cited

U.S. PATENT DOCUMENTS

| | | | |
|---|---|---|---|
| 4,177,499 A | 12/1979 | Volkmann | |
| 4,340,265 A | 7/1982 | Ott et al. | |
| 4,367,891 A | 1/1983 | Wauer et al. | |
| 4,779,031 A | 10/1988 | Arends et al. | |
| 4,806,110 A | 2/1989 | Lindeman | |
| 4,808,116 A | 2/1989 | Unger et al. | |
| 4,821,594 A | 4/1989 | Rosheim et al. | |
| 4,903,536 A | 2/1990 | Salisbury, Jr. et al. | |
| 4,935,661 A | 6/1990 | Heinecke et al. | |
| 4,937,759 A | 6/1990 | Vold | |
| 4,957,320 A | 9/1990 | Ulrich | |
| 4,975,856 A | 12/1990 | Vold et al. | |
| 4,998,884 A | 3/1991 | Ishikawa et al. | |
| 5,038,088 A | 8/1991 | Arends et al. | |
| 5,046,375 A | 9/1991 | Salisbury, Jr. et al. | |
| 5,155,423 A | 10/1992 | Karlen et al. | |
| 5,159,218 A | 10/1992 | Murry et al. | |
| 5,207,114 A | 5/1993 | Salisbury, Jr. et al. | |
| 5,207,117 A | 5/1993 | Bauer | |
| 5,213,522 A | 5/1993 | Kojima | |
| 5,280,983 A | 1/1994 | Maydan et al. | |
| 5,281,026 A | 1/1994 | Bartilson et al. | |
| 5,309,349 A | 5/1994 | Kwan | |
| 5,325,265 A | 6/1994 | Turlik et al. | |
| 5,327,790 A | 7/1994 | Levin et al. | |
| 5,346,351 A | 9/1994 | Priolo et al. | |
| D351,849 S | 10/1994 | Cheung et al. | |
| D352,050 S | 11/1994 | Ulrich et al. | |
| 5,383,340 A | 1/1995 | Larson et al. | |
| 5,385,478 A | 1/1995 | Niekawa | |
| 5,388,480 A | 2/1995 | Townsend | |
| 5,501,498 A | 3/1996 | Ulrich | |
| 5,597,313 A | 1/1997 | Lindeman | |
| 5,625,265 A | 4/1997 | Vlahu | |
| 5,629,574 A * | 5/1997 | Cognetti | H02K 5/225 174/541 |
| 5,663,672 A | 9/1997 | Nuechterlein | |
| 5,678,646 A | 10/1997 | Fliege | |
| 5,704,794 A | 1/1998 | Lindeman | |
| 5,755,596 A | 5/1998 | Watson | |
| 5,912,541 A | 6/1999 | Bigler et al. | |
| 5,930,112 A | 7/1999 | Babinski et al. | |
| 5,934,096 A | 8/1999 | Munson et al. | |
| 5,967,580 A | 10/1999 | Rosheim | |
| 6,019,165 A | 2/2000 | Batchelder | |
| 6,049,474 A | 4/2000 | Platnic | |
| 6,243,654 B1 | 6/2001 | Johnson et al. | |
| 6,304,411 B1 * | 10/2001 | Elsing | G11B 19/20 360/99.24 |
| 6,344,972 B2 | 2/2002 | Estieule et al. | |
| 6,462,457 B2 | 10/2002 | Shah et al. | |
| 6,478,626 B2 | 11/2002 | Dingenotto et al. | |
| 6,479,916 B1 * | 11/2002 | Bobay | H02K 11/33 310/418 |
| 6,517,132 B2 | 2/2003 | Matsuda et al. | |
| 6,541,881 B1 | 4/2003 | Turner | |
| 6,583,682 B1 | 6/2003 | Dubhashi et al. | |
| 6,684,944 B1 | 2/2004 | Byrnes et al. | |
| 6,705,902 B1 | 3/2004 | Yi et al. | |
| 6,817,641 B1 | 11/2004 | Singleton, Jr. | |
| 6,929,487 B1 | 8/2005 | Raghavendra et al. | |
| 6,942,018 B2 | 9/2005 | Goodson et al. | |
| 6,953,985 B2 | 10/2005 | Lin et al. | |
| 7,511,443 B2 * | 3/2009 | Townsend | B25J 9/1612 165/185 |
| 7,854,631 B2 | 12/2010 | Townsendl et al. | |
| 7,893,644 B2 | 2/2011 | Townsend et al. | |
| 9,148,044 B2 * | 9/2015 | De Filippis | F04D 25/08 |
| 2002/0063486 A1 | 5/2002 | Huth | |
| 2002/0079859 A1 | 6/2002 | Lumsden | |
| 2004/0103740 A1 | 6/2004 | Townsend et al. | |
| 2004/0137791 A1 | 7/2004 | Palomaki et al. | |
| 2004/0181730 A1 | 9/2004 | Monfared et al. | |
| 2005/0145366 A1 | 7/2005 | Erel | |
| 2011/0095999 A1 * | 4/2011 | Hayton | G06F 1/1626 345/173 |
| 2012/0160596 A1 * | 6/2012 | Yamasaki | B62D 5/0406 180/443 |

FOREIGN PATENT DOCUMENTS

| | | | |
|---|---|---|---|
| JP | 9-247903 | | 9/1997 |
| JP | 10-51989 | | 2/1998 |
| JP | 11-41971 | | 2/1999 |
| JP | 11-356006 | | 12/1999 |
| JP | 2000-70589 | | 3/2000 |
| JP | 2000-78880 | | 3/2000 |
| JP | 2001-238490 | | 8/2001 |
| JP | 2004328932 A | * | 11/2004 |
| WO | WO 00/14832 | | 3/2000 |
| WO | WO 2004/028753 | | 4/2004 |
| WO | WO 2006/039662 | | 4/2006 |

OTHER PUBLICATIONS

Castle Creations, Brochure, Phoenix-25TM, 2004.
Eccles, Gate-Drive Optocoupler Targets Low-Power Motor Control, http://electronicdesign.com/electromechanical/gate-drive-optocoupler-targets-low-power-motor-control, 2001.
Puttré, Space-Age Robots Come Down to Earth, Mechanical Engineering, Jan. 1995, pp. 88-89.
Texas Instruments Europe, Three Phase Current Measurements Using a Single Line Resistor on the TMS320F240, 1998.
Robotics Research Corporation, Dexterous Manipulators and Advanced Control Systems, 2005.

* cited by examiner

METHOD AND APPARATUS FOR CONNECTING AN ULTRACOMPACT, HIGH-PERFORMANCE MOTOR CONTROLLER TO AN ULTRACOMPACT, HIGH-PERFORMANCE BRUSHLESS DC MOTOR

REFERENCE TO PENDING PRIOR PATENT APPLICATION

This patent application claims benefit of prior U.S. Provisional Patent Application Ser. No. 61/911,558, filed Dec. 4, 2013 by Barrett Technology, Inc. and Brian Zenowich et al. for MEANS TO CREATE AN ULTRAMINIATURE MOTOR AMPLIFIER WITH INTEGRATED POSITION SENSING (P3), which patent application is hereby incorporated herein by reference.

FIELD OF THE INVENTION

This invention relates to electrical motors in general, controllers for electrical motors, and methods and apparatus for connecting controllers to electrical motors.

BACKGROUND OF THE INVENTION

Barrett Technology, Inc. of Newton, Mass., USA has developed an ultracompact, high-performance motor controller (UCHPMC) which provides rotor-position sensing, electronic commutation and motor-current amplifiers with precise current sensing in a cylindrical module measuring only 19 mm (diameter)×8 mm (tall), roughly matching the diameter of the smallest ultracompact, high-performance brushless DC motors. See, for example, U.S. Pat. Nos. 7,511,443; 7,854,631; and 7,893,644.

This small size UCHPMC is especially difficult to achieve with low cost because the need for affordability dictates that only conventional printed circuit board (PCB) techniques be used (i.e., no hidden or blind vias or microvias); and the silicon integrated circuits (ICs) must be conventionally packaged (e.g., no flip-chip techniques with special wire bonding), although moderate layer counts (e.g., 6 layers) are possible.

The UCHPMCs of Barrett Technology, Inc. are especially convenient because the motor controller and the means for sensing the instantaneous motor position are included in the same module, thereby eliminating a large number of electrical conductors and electrical connectors. Furthermore, the small size of the UCHPMCs allows them to be mounted to the back (i.e., body) of a brushless DC motor in the volume of space normally reserved for just the rotor-position sensing feature, hovering just above a tiny magnetic or optical target that spins with the rotor of the motor (it is the detection of the tiny magnetic or optical target which provides the rotor-position sensing feature of the UCHPMC).

The UCHPMCs of Barrett Technology, Inc. provide a significant advance in the field of motor controllers. However, even with the UCHPMCs of Barrett Technology, Inc., there remain several problems with the application of the UCHPMC modules. For one thing, the UCHPMC modules require a rigid and robust mechanical connection between the UCHPMC body and the body of the motor in order to permit effective rotor-position sensing. For another thing, the scheme for (1) making robust electrical connections between the UCHPMC and the motor windings (and any thermistors or redundant Hall position sensors) coming from the motor body, and (2) making robust electrical connections between the UCHPMC and the bussed power and bussed serial communications, require a large amount of hand soldering. The manual nature of these solder connections allows occasional cold solder joints, which can result in inconsistent quality control. Furthermore, where electrical connection failures occur, these failures often occur in the field after the systems have been tested and shipped to the customer. At that point, the electrical connection failures can be difficult and time-consuming to remedy. In addition, where the UCHPMC fails in the field, replacing the UCHPMC requires that the UCHPMC module be disconnected (both mechanically and electrically) from the back (i.e., body) of the motor. This can be inconvenient and time-consuming to effect, particularly when the motor and UCHPMC module are positioned deep within a larger assembly (e.g., within the interior of a robot or robot limb).

Thus there is a need for a new method and apparatus for connecting an ultracompact, high-performance motor controller (UCHPMC) to an ultracompact, high-performance brushless DC motor which provides reliable mechanical and electrical connections between the UCHPMC and the motor, and which allows the UCHPMC to be quickly and easily "swapped out" in the event that the UCHPMC needs to be replaced.

There is also a need for a new method and apparatus for connecting other motor controllers to electrical motors which provide reliable mechanical and electrical connections between the motor controller and the electrical motor, and which allows the motor controller to be quickly and easily "swapped out" in the event that the motor controller needs to be replaced.

There is also a need for a new method and apparatus for interfacing a given motor controller, such as a specific UCHPMC, to a large family of different motors without requiring changes to the UCHPMC component itself.

SUMMARY OF THE INVENTION

The present invention comprises the provision and use of a novel method and apparatus for connecting an ultracompact, high-performance motor controller (UCHPMC) to an ultracompact, high-performance brushless DC motor which provides reliable mechanical and electrical connections between the UCHPMC and the motor, and which allows the UCHPMC to be quickly and easily swapped out in the event that the UCHPMC needs to be replaced.

The present invention also comprises the provision and use of a novel method and apparatus for connecting other motor controllers to electrical motors which provide reliable mechanical and electrical connections between the motor controller and the electrical motor, and which allows the motor controller to be quickly and easily swapped out in the event that the motor controller needs to be replaced.

The present invention also comprises a new method and apparatus for interfacing a given motor controller, such as a specific UCHPMC, to a large family of different motors without requiring changes to the UCHPMC component itself.

In one preferred form of the present invention, there is provided apparatus for connecting a motor controller to an electrical motor, said apparatus comprising:

a motor interface board;

a mounting mechanism for mechanically connecting said motor interface board to the electrical motor;

at least one input lead for electrically connecting said motor interface board to at least one of an electrical power source and an electrical signal source;

at least one output lead for electrically connecting said motor interface board to the electrical motor; and at least one connector for mechanically and electrically connecting said motor interface board to the motor controller.

In another preferred form of the present invention, there is provided apparatus comprising:

an electrical motor; and apparatus for connecting a motor controller to said electrical motor, said apparatus comprising:

a motor interface board;

a mounting mechanism for mechanically connecting said motor interface board to said electrical motor;

at least one input lead for electrically connecting said motor interface board to at least one of an electrical power source and an electrical signal source;

at least one output lead for electrically connecting said motor interface board to said electrical motor; and at least one connector for mechanically and electrically connecting said motor interface board to the motor controller.

In another preferred form of the present invention, there is provided a method for connecting a motor controller to an electrical motor, said method comprising:

mechanically mounting a motor interface board to the electrical motor;

electrically connecting at least one input lead of said motor interface board to at least one of an electrical power source and an electrical signal source;

electrically connecting at least one output lead of said motor interface board to the electrical motor; and mechanically and electrically connecting said motor interface board to the motor controller using at least one connector.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of a novel method and apparatus for connecting an ultracompact, high-performance motor controller (UCHPMC) to an ultracompact, high-performance brushless DC motor which provides reliable mechanical and electrical connections between the UCHPMC and the motor, and which allows the UCHPMC to be quickly and easily swapped out in the event that the UCHPMC needs to be replaced.

The present invention also comprises the provision and use of a novel method and apparatus for connecting other motor controllers to electrical motors which provide reliable mechanical and electrical connections between the motor controller and the electrical motor, and which allows the motor controller to be quickly and easily swapped out in the event that the motor controller needs to be replaced.

The present invention also comprises a new method and apparatus for interfacing a given motor controller, such as a specific UCHPMC, to a large family of different motors without requiring changes to the UCHPMC component itself.

More particularly, in one preferred form of the present invention, the invention comprises the provision and use of a motor interface board (MIB) which permits an ultracompact, high-performance motor controller (UCHPMC) to be mechanically and electrically interfaced with a large number of commercially available electrical motors—the MIB acts as both a mechanical and electrical interface between the UCHPMC and the electrical motor, in a very small space, using the motor manufacturer's (or original equipment manufacturer's) choice of electrical connectors, wire gauges, sensors, I/O, and mechanical mounts.

Thus, the motor interface board (MIB) provides a fast, easy and inexpensive solution to the task of providing mechanical and electrical connections between the UCHPMC and the electrical motor, and can be used in substantially any situation where a motor controller is to be attached directly to a motor body.

Integrated circuits and other active electronic elements contained in a UCHPMC module are eventually prone to failure. While it is generally not practical to repair a damaged UCHPMC, it is of great benefit to allow the user to replace a damaged UCHPMC module easily with a spare in the field. The MIB has, itself, no active electronics (i.e., it is essentially a printed circuit board with electrical traces and electrical and mechanical connectors) and so the MIB can be permanently attached (mechanically and electrically) to the body of a motor at low cost, without fear of component failure and subsequent need for replacement. At the same time, however, in the event that the UCHPMC module needs replacement, the MIB permits the replacement UCHPMC to be quickly and easily connected, both mechanically and electrically, to the motor.

Figure 1:
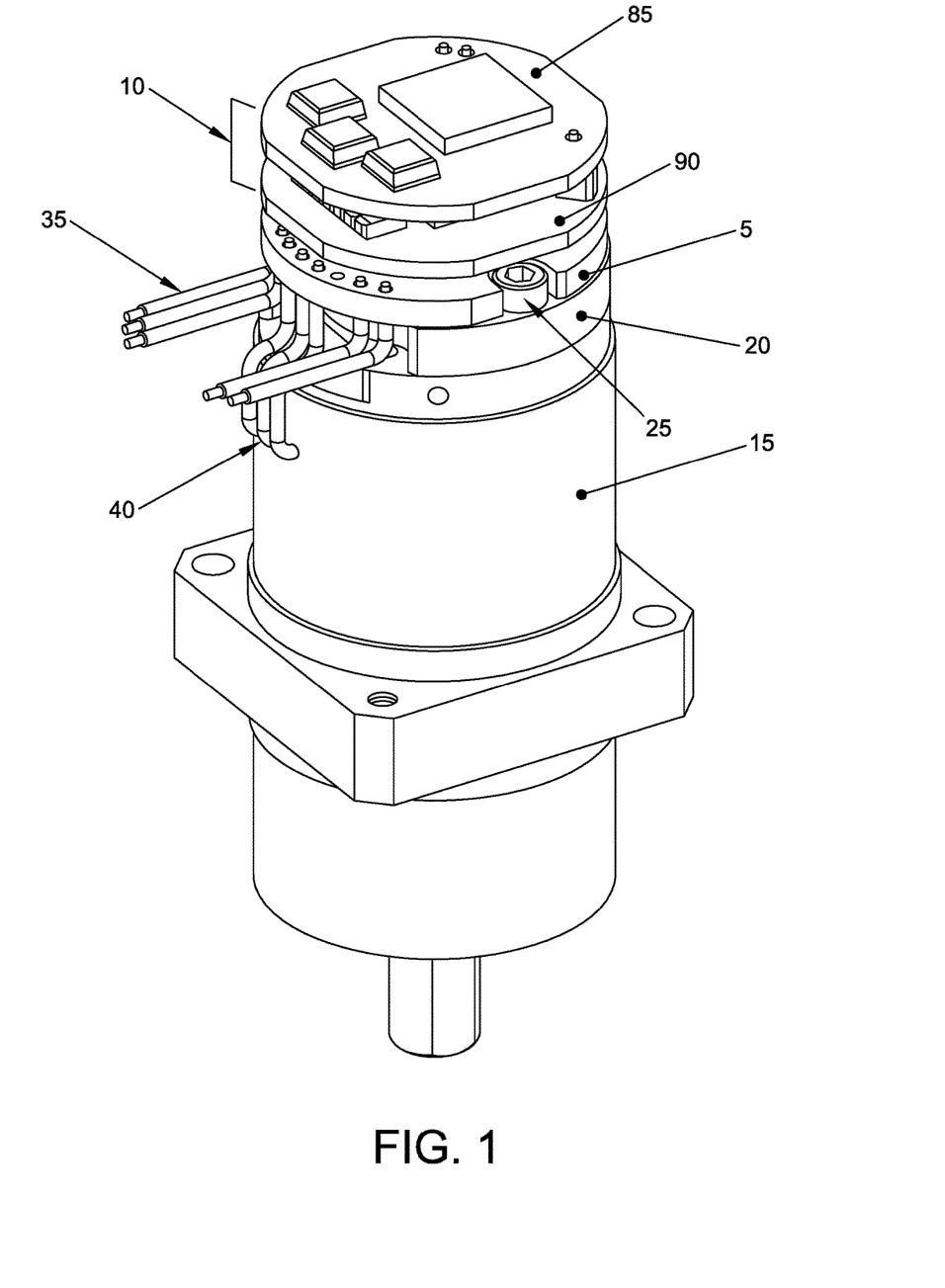
FIG. 1 is a schematic view showing a motor interface board (MIB) connecting an ultracompact, high-performance motor controller (UCHPMC) to an ultracompact, high-performance brushless DC motor.
Figure 2:
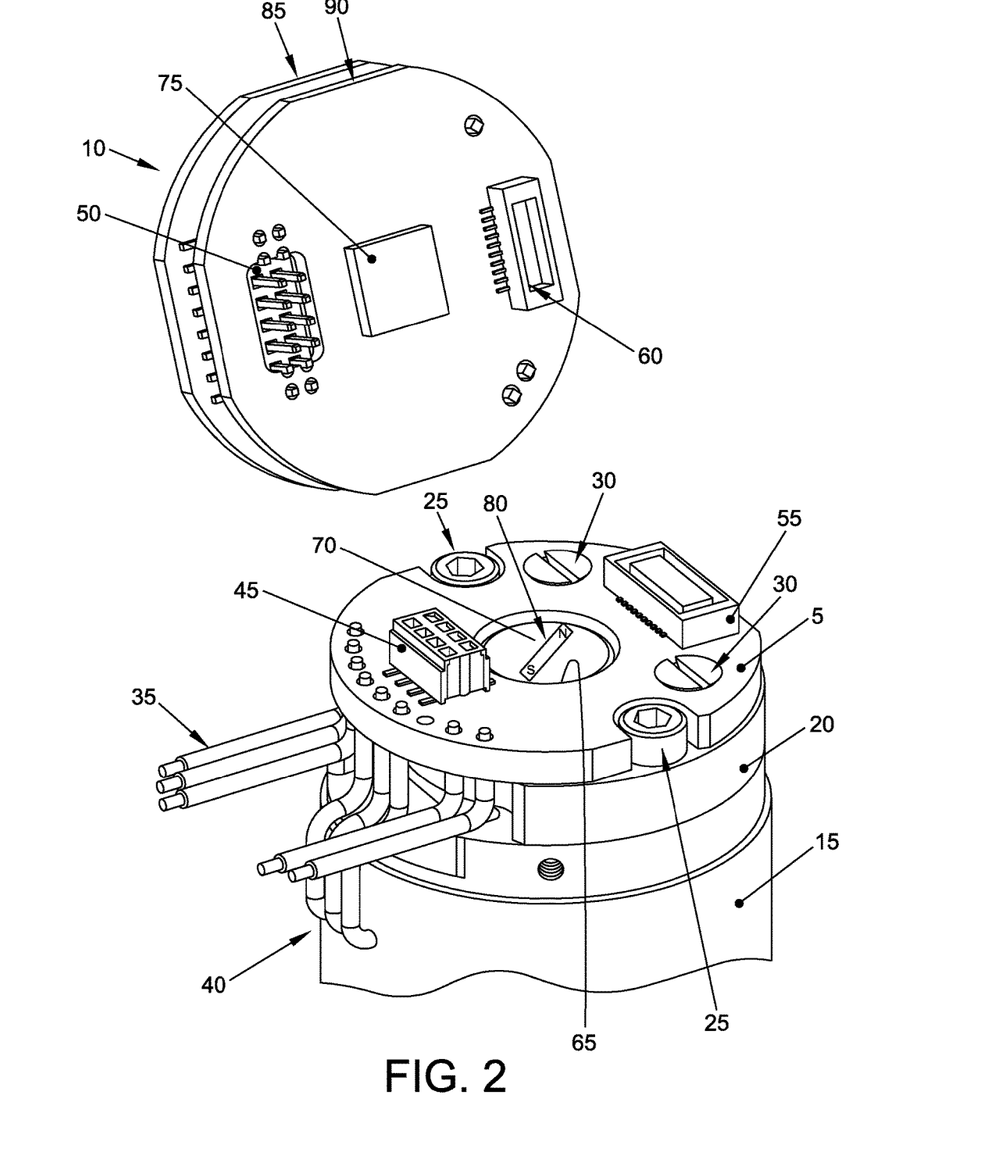
FIG. 2 is a schematic view like that of FIG. 1, except showing the UCHPMC removed from the MIB.

More particularly, and looking now at FIGS. 1 and 2, there is shown a motor interface board (MIB) 5 formed in accordance with the present invention. MIB 5 is intended to connect an ultracompact, high-performance motor controller (UCHPMC) 10 to a motor 15 (preferably an ultracompact, high-performance brushless DC motor), whereby to provide mechanical and electrical connections between the two components. In one preferred form of the invention, MIB 5 comprises a printed circuit board which is mechanically mounted to motor 15 via a mount 20, with mount 20 being secured to motor 15 via screws 25 and with MIB 5 being secured to mount 20 via screws 30. Wires 35 connect the traces (not shown) of MIB 5 to bus power supplies and CANbus communications, and wires 40 connect the traces (not shown) of MIB 5 to the motor phase leads and ground on the motor chassis. A connector 45 (which is connected to the traces, not shown, of MIB 5) mates with a counterpart connector 50 on UCHPMC 10 (e.g., so as to establish a high power electrical connection between MIB 5 and UCHPMC 10), and a connector 55 (which is connected to the traces, not shown, of MIB 5) mates with a counterpart connector 60 on UCHPMC 10 (e.g., so as to establish a low power electrical connection between MIB 5 and UCHPMC 10). Preferably connector 45 on MIB 5 and counterpart connector 50 on UCHPMC 10 comprise a plug-type (e.g., female-male) connection, and preferably connector 55 on MIB 5 and counterpart connector 60 on UCHPMC 10 comprise a plug-type (e.g., male-female) connection, whereby to provide robust mechanical and electrical connections between the elements. An opening 65 in MIB 5 exposes the rotary shaft 70 of motor 15, such that the rotational disposition of motor shaft 70 may be read by a reader 75 provided on UCHPMC 10. By way of example but not limitation, a magnet 80 may be attached to shaft 70 and read by an appropriate magnetic reader 75 on UCHPMC 10. Alternatively, an optical pattern may be attached to shaft 70 and read by an appropriate optical reader on UCHPMC 10.

In one construction, UCHPMC 10 may comprise two printed circuit boards 85, 90, where board 85 is a "high power" board and board 90 is a "signals" board, with boards 85, 90 having appropriate connections therebetween as is known in the art.

In one preferred manner of use, MIB 5 is mechanically and electrically connected to motor 15, and then UCHPMC 10 is mechanically and electrically connected to MIB 5.

The component cost of the MIB 5 is driven primarily by the low-cost connectors (e.g., connectors 45 and 55) that are mounted to MIB 5. As noted above, connectors 45, 55 mate with connectors 50, 60, respectively on UCHPMC 10. Note that MIB connectors 45, 55 are strategically positioned on MIB 5 in orientations that perfectly align the UCHPMC module 10 to MIB 5 and hence appropriately align the UCHPMC 10 to motor 15, i.e., so that reader 75 is properly disposed relative to motor shaft 70. Note also that any number of connectors may be used to mechanically and electrically connect UCHPMC 10 to MIB 5, as long as the connectors are correctly geometrically placed to ensure appropriate mechanical and electrical connection between UCHPMC 10 and MIB 5, including appropriate positioning of reader 75 of UCHPMC 10 relative to motor shaft 70 of electrical motor 15. It will be appreciated that having at least a pair of connectors 45, 55, spread apart from each other in the manner shown, gives the mechanical connection between UCHPMC 10 and MIB 5 better stability. In the case of only two MIB connectors 45, 55, it can be desirable to have one of the connectors 45, 55 be relatively long (e.g., approximately ½ the diameter of MIB 5) for good mechanical stability. Alternatively, if using short connectors, it can be desirable to use at least three connectors, which may be disposed near the periphery of MIB 5. For example, three connectors can be placed 120-degrees apart, forming a tripod, again for good mechanical stability. In one preferred embodiment, connector 45 of MIB 5 comprises a female connector and connector 50 of UCHPMC 10 comprises a male connector, and serves to provide power-level connections, and connector 55 of MIB 5 comprises a male connector and connector 60 of UCHPMC 10 comprises a female connector, and serves to provide signal-level connections.

The compact nature of the UCHPMC 10 makes the MIB concept even more valuable because its mass (2.5 grams for Barrett Technology's newest UCHPMC) is significantly less than the pull-out strength of the connectors 45, 50 and 55, 60. In the present reduction to practice, the UCHPMC weighs 2.5 grams and the pull-out strength of the connectors 45, 50 and 55, 60 is more than 250 grams. Under these circumstances, it would take in excess of 100 g's of shock loading, acting in a worst-case direction, to cause the UCHPMC 10 to become unintentionally separated from the MIB 5. However, intentional separation is well within a human's finger strength. It will be appreciated that the pull-out strength of the connectors used to mechanically and electrically connect UCHPMC 10 to MIB 5 will vary in accordance with the configuration (e.g., construction and number) of the connectors. In general, it is believed that, for most applications, it will be adequate if the connectors are capable of withstanding shock loading on a given motor controller of 10 g's or more.

FIGS. 1 and 2 show how MIB 5 is used to mechanically and electrically connect the UCHPMC module 10 with a motor 15. In one preferred form of the invention, the motor's manufacturer (or the original equipment manufacturer) creates a motor-specific MIB 5 which is mechanically and electrically connected to a motor, as shown in FIGS. 1 and 2.

However, the MIB 5 need not host only one motor. Rather, the tail ends (i.e., bodies) of two or more motors 15 (see FIG. 3) can be ganged together as an array onto one large MIB 5, where the MIB 5 carries appropriate connectors (e.g., connectors 45, 55) for each of the motors which is to be hosted by MIB 5 (i.e., so as to allow appropriate electrical and mechanical connection of a UCHPMC 10 to a motor 15 via the intervening large MIB 5. As a result of this construction, the large MIB 5 will appropriately connect each of the motors 15 to a UCHPMC 10, whereby to provide each of the motors 15 with appropriate electrical power and communications (CANbus, EtherCAT, or some other type) connections. In this case, the 4-, 5-, or 6-wire bus carrying power and communications need not generate a complex wiring harness, with many difficult-to-manufacture Y-junctions— instead, creating the necessary Y-junctions on a printed circuit board in the MIB 5 is trivial. In this case, one only needs to carry the 4-, 5-, or 6-wire bus to the edge of the single MIB 5.

Figure 3:
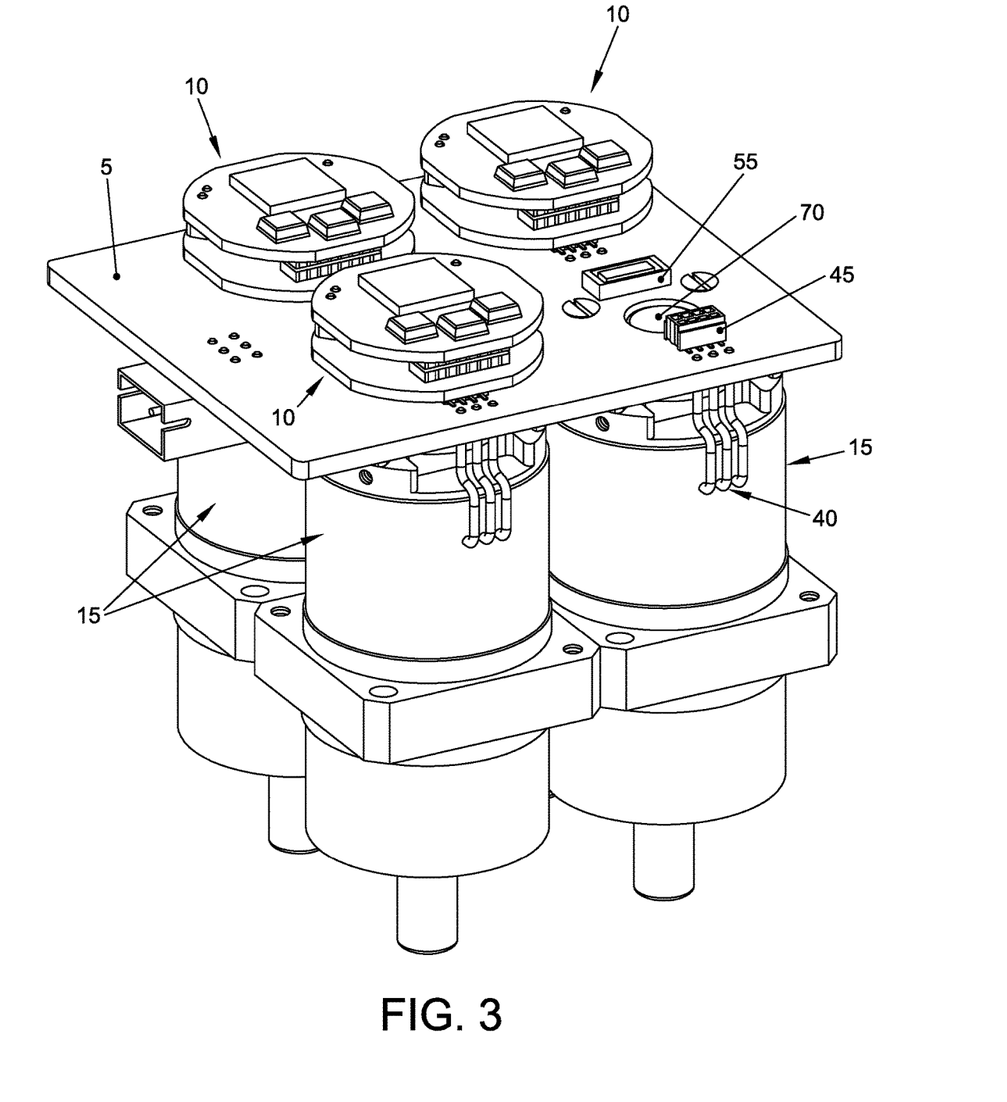
FIG. 3 is a schematic view showing how a single MIB may be used to connect multiple UCHPMCs to multiple motors.
Figure 4:
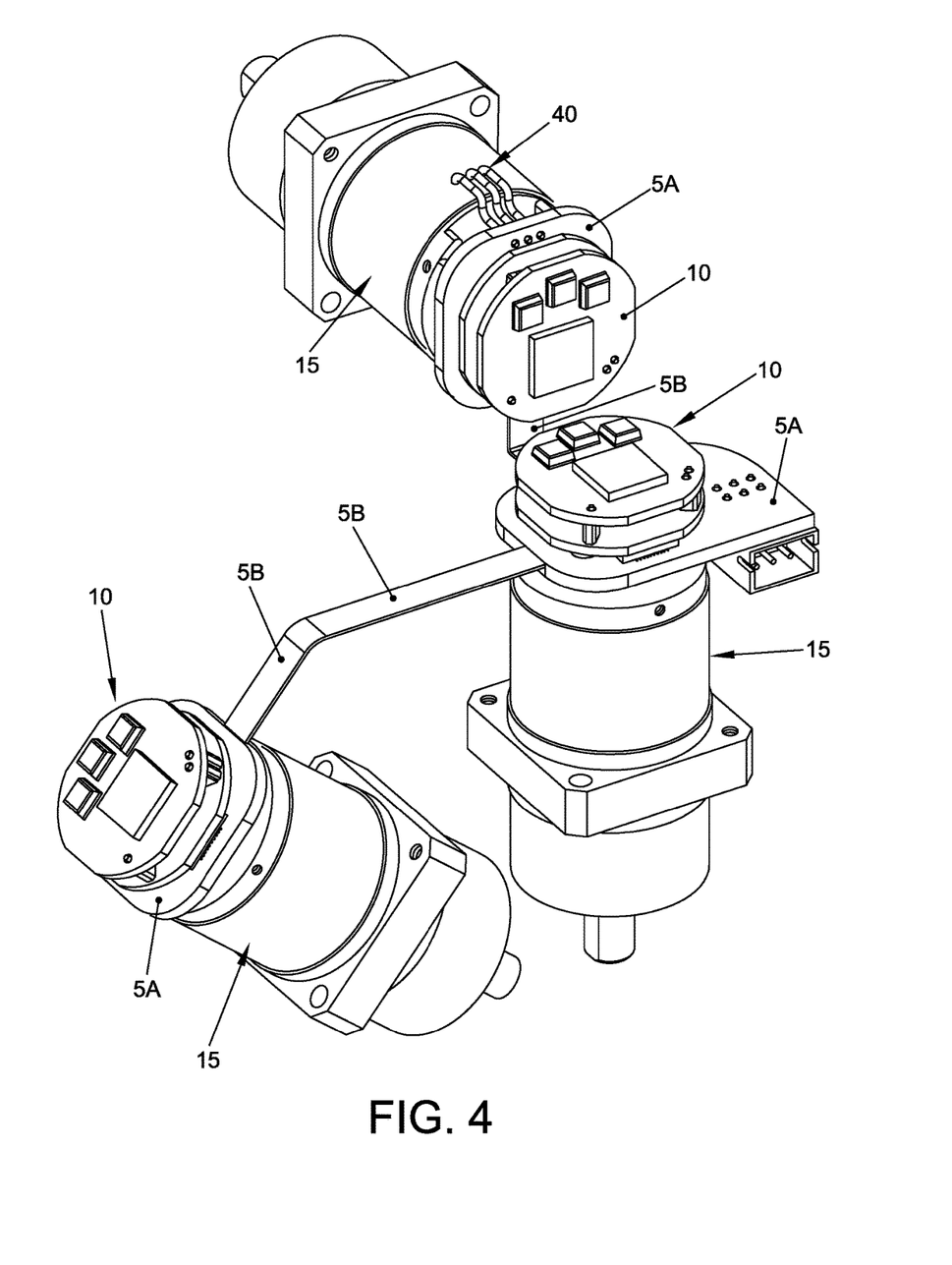
FIG. 4 is a schematic view like that of FIG. 3, except showing that the MIB may comprise multiple stiff board segments connected by flexible board segments.

Furthermore, for the case of two or more motors 15 being connected on one MIB 5, the MIB 5 need not be a single stiff printed circuit board (e.g., such as is shown in FIGS. 1-3), but can easily be made up of many stiff board segments connected together via flexible board (sandwiched Mylar and copper traces) segments. See FIG. 4, where MIB 5 comprises a plurality of stiff printed circuit boards 5A connected together via flexible board segments 5B. Creating this type of flex printed circuit board is a well-known and cost-effective technique. In the case of two or more motors 15 being mounted to a single MIB 5, this flex-board technology allows the motors 15 to have any angular displacements relative to one another and allows relative motions among the motors. There are even cases where the motors remain fixed and parallel, but spread significantly far apart with obstacles and constraints between them, such that using a MIB 5 comprising a single rigid board would not be practical. In this case, forming MIB 5 with multiple stiff boards 5A connected together by flex boards 5B provides a good solution, since it allows the components of MIB 5 to "snake" among various obstacles and constraints.

Once the MIB 5 is attached to the motor or motors 15, then a UCHPMC module 10 literally plugs onto the MIB 5 at the tail-end (i.e., body) of each motor.

In the preferred embodiment, the motor manufacturer (or the original equipment manufacturer) also bonds a tiny N-S "button" magnet 80 (e.g., 6 mm in diameter×2.5 mm in height) to the exposed tail end of the motor shaft 70 (FIG. 2) that acts as a rotating target which an array of Hall sensors (i.e., magnetic reader 75) on the UCHPMC module 10 can track in real-time to determine the instantaneous rotor position, even at high velocities of several thousand RPM. This rotor-position signal, along with an externally-commanded motor torque, position, or velocity, is then used in calculations on the Digital Signal Processor (DSP) carried by the UCHPMC 10 that determines the correct instantaneous currents for each of the three motor phases of motor 15. To read the rotor-position properly requires the design of the MIB 5 to align and center the magnetic reader 75 of UCHPMC module 10 on the motor axis at a specified offset distance from the face of the magnet 80. This may be ensured by the use of appropriate connectors (such as the connectors 45, 50 and 55, 60) which are used to mechanically and electrically connect UCHPMC module 10 to MIB 5. Fortunately, the tolerances of such rotor-position sensors are well within the tolerances of the connectors used to connect UCHPMC module 10 to MIB 5.

The MIB concept discussed above is applicable with both large and small motors. To operate the larger motor shown in FIG. 5 at its maximum capacity requires a motor controller more substantial than Barrett's existing UCHPMC. One can utilize a larger capacity motor controller module and plug it into an appropriate MIB.

Figure 5:
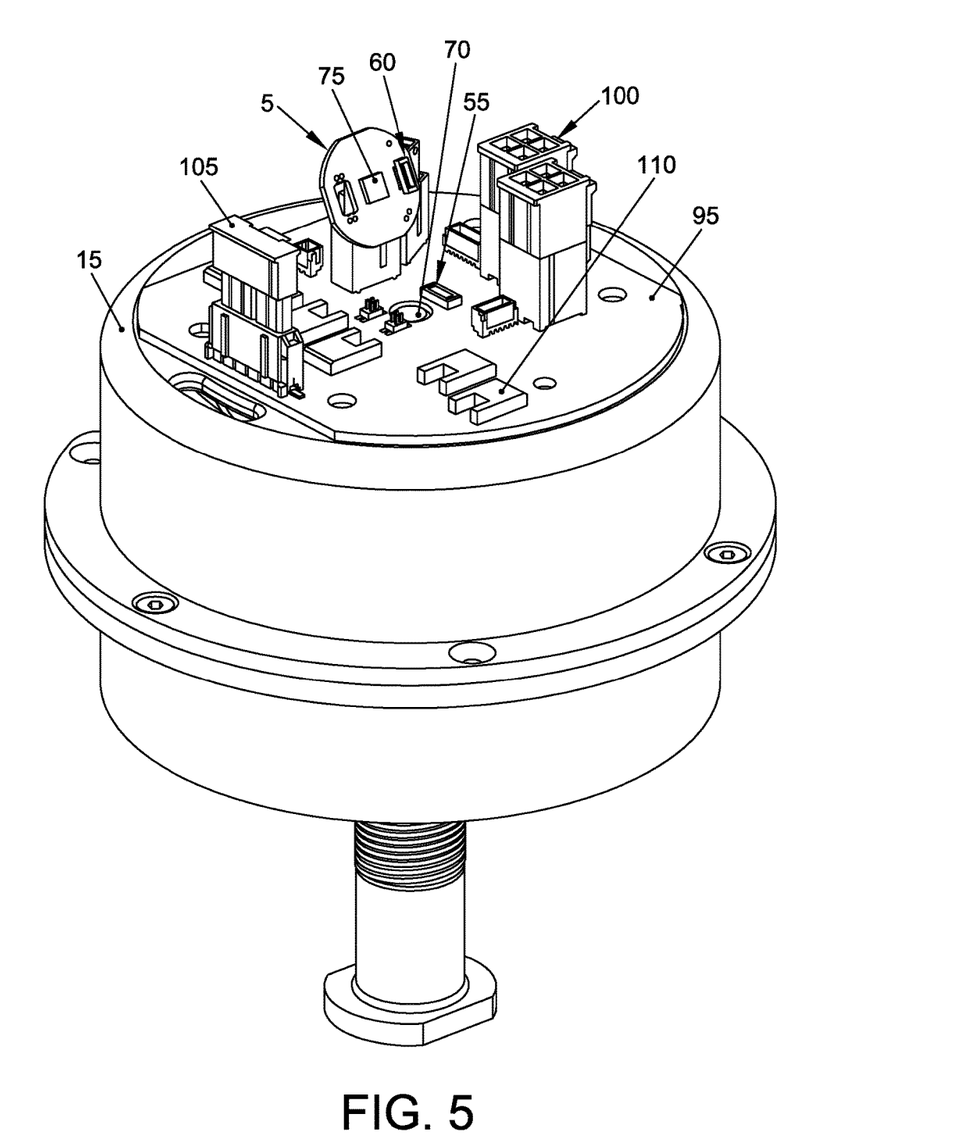
FIG. 5 is a schematic view showing how the MIB can mount different motor controllers to different motors.

Alternatively, as show in FIG. 5, the UCHPMC 10 can be separated into two components (e.g., Power PCB 85 and Signal PCB 90), and use the existing Signal PCB 90 and attach it to a larger "combined MIB 5 and Power PCB 85" board 95 using similar UCHPMC-to-MIB connections. In other words, in this form of the invention, MIB 5 can be combined with Power PCB 85.

The larger board 95 can handle larger currents with larger connectors 100, 105 and larger MOSFETS 110, while the existing UCHPMC Signal Board 90 remains identical across motor families.

MODIFICATIONS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. Apparatus for connecting a motor controller board to an electrical motor, wherein the motor controller board comprises a motor controller for controlling operation of the electrical motor, said apparatus comprising:
   a motor interface board;
   a mounting mechanism for mechanically securing said motor interface board to the electrical motor;
   at least one input lead for electrically connecting said motor interface board to at least one of an electrical power source and an electrical signal source;
   at least one output lead for electrically connecting said motor interface board to the electrical motor; and
   at least one plug connector mounted to said motor interface board for mechanically and electrically connecting the motor controller board to said motor interface board with a plug connection such that the motor interface board is mechanically and electrically interposed between the electrical motor and the motor controller board, and the motor controller board is connectable to said motor interface board without the need for soldering or welding, such that said motor controller board can be quickly and easily replaced by another motor controller board without affecting the electrical motor.

2. Apparatus according to claim 1 wherein said at least one plug connector mates with a corresponding plug connector of the motor controller board.

3. Apparatus according to claim 2 wherein said at least one plug connector of said motor interface board mates with a corresponding plug connector of the motor controller board so as to withstand in excess of 10 g's of shock loading.

4. Apparatus according to claim 3 wherein said at least one plug connector of said motor interface board mates with a corresponding plug connector of the motor controller board so as to provide a pull-out strength in excess of 250 grams.

5. Apparatus according to claim 1 wherein said at least one plug connector of said motor interface board comprises one of a male connector and a female connector.

6. Apparatus according to claim 1 wherein said at least one plug connector of said motor interface board comprises at least two connectors.

7. Apparatus according to claim 6 wherein said at least two plug connectors of said motor interface board are evenly circumferentially spaced from one another.

8. Apparatus according to claim 6 wherein one plug connector of said motor interface board is configured for power transmission and one plug connector of said motor interface board is configured for signal transmission.

9. Apparatus according to claim 1 wherein said motor interface board comprises an opening for exposing the shaft of the electrical motor to the motor controller board when the apparatus is used to connect a motor controller board to an electrical motor.

10. Apparatus according to claim 9 wherein said at least one plug connector of said motor interface board is positioned on said motor interface board so that when said at least one plug connector of said motor interface board mechanically and electrically connects said motor interface board to the motor controller board, the shaft of the motor is aligned with a reader on the motor controller board for determining the rotational disposition of the shaft of the electrical motor.

11. Apparatus according to claim 1 wherein said motor interface board is configured to be connected to a single electrical motor.

12. Apparatus according to claim 1 wherein said motor interface board is configured to be connected to a plurality of electrical motors.

13. Apparatus according to claim 1 wherein said motor interface board is substantially rigid.

14. Apparatus according to claim 1 wherein said motor interface board comprises at least two rigid portions connected by a flexible portion.

15. Apparatus according to claim 1 wherein said motor interface board has a form factor which substantially matches at least one form factor of the electrical motor.

16. Apparatus comprising:
   an electrical motor; and
   apparatus for connecting a motor controller board to said electrical motor, wherein the motor controller board comprises a motor controller for controlling operation of the electrical motor, said apparatus comprising:
      a motor interface board;
      a mounting mechanism for mechanically securing said motor interface board to said electrical motor;
      at least one input lead for electrically connecting said motor interface board to at least one of an electrical power source and an electrical signal source;
      at least one output lead for electrically connecting said motor interface board to said electrical motor; and at least one plug connector mounted to said motor interface board for mechanically and electrically connecting the motor controller board to said motor interface board with a plug connection such that the motor interface board is mechanically and electrically interposed between the electrical motor and the motor controller board, and the motor controller board is connectable to said motor interface board without the need for soldering or welding, such that the motor controller board can be quickly and easily replaced by another motor controller board without affecting said electrical motor.

17. Apparatus according to claim 16 wherein said electrical motor comprises a brushless DC motor.

18. Apparatus according to claim 17 further comprising said motor controller board.

19. Apparatus according to claim 18 wherein said motor controller board comprises a rotor-position sensor, electronic commutation elements and motor-current amplifiers.

20. A method for connecting a motor controller board to an electrical motor, wherein the motor controller board comprises a motor controller for controlling operation of the electrical motor, said method comprising:

mechanically securing a motor interface board to the electrical motor;

electrically connecting at least one input lead of said motor interface board to at least one of an electrical power source and an electrical signal source;

electrically connecting at least one output lead of said motor interface board to the electrical motor; and mechanically and electrically connecting said motor interface board to the motor controller board using at least one plug connector mounted to said motor interface board for mechanically and electrically connecting the motor controller board to said motor interface board with a plug connection such that the motor interface board is mechanically and electrically interposed between the electrical motor and the motor controller board, and the motor controller board is connected to said motor interface board without the need for soldering or welding, such that said motor controller board can be quickly and easily replaced by another motor controller board without affecting the electrical motor.

\* \* \* \* \*